UNITED STATES PATENT OFFICE.

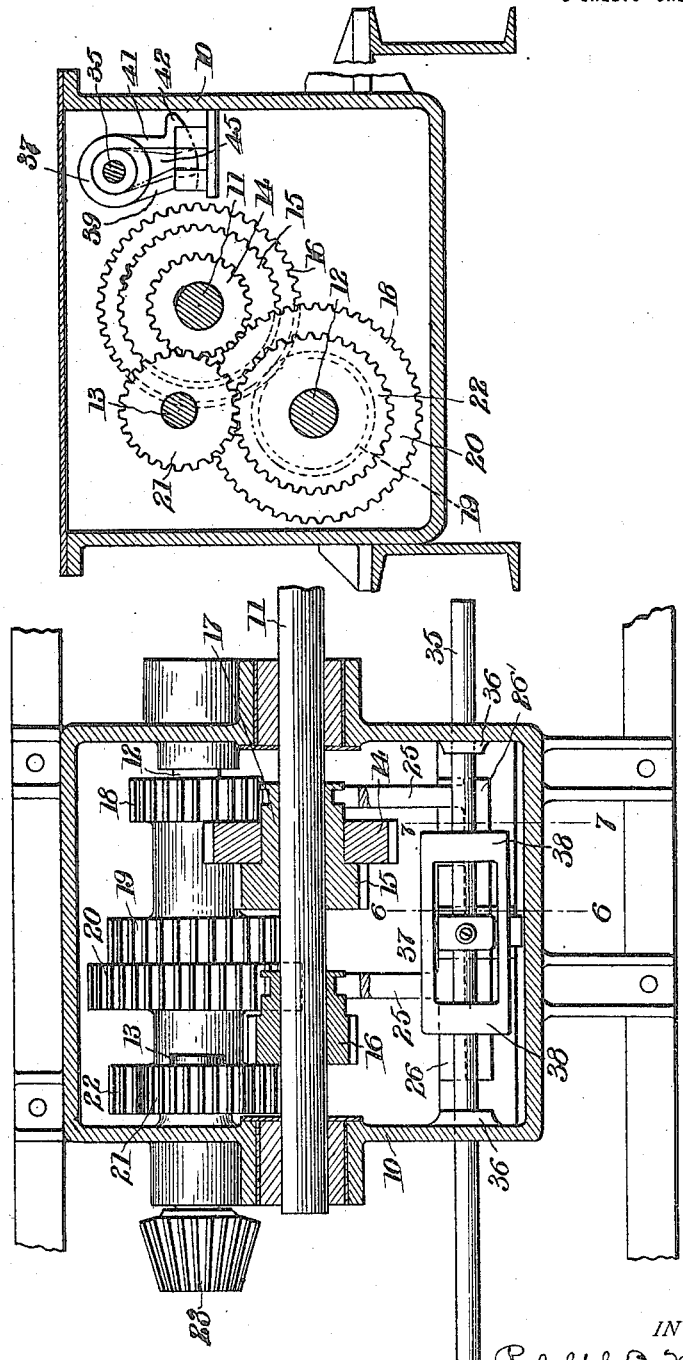

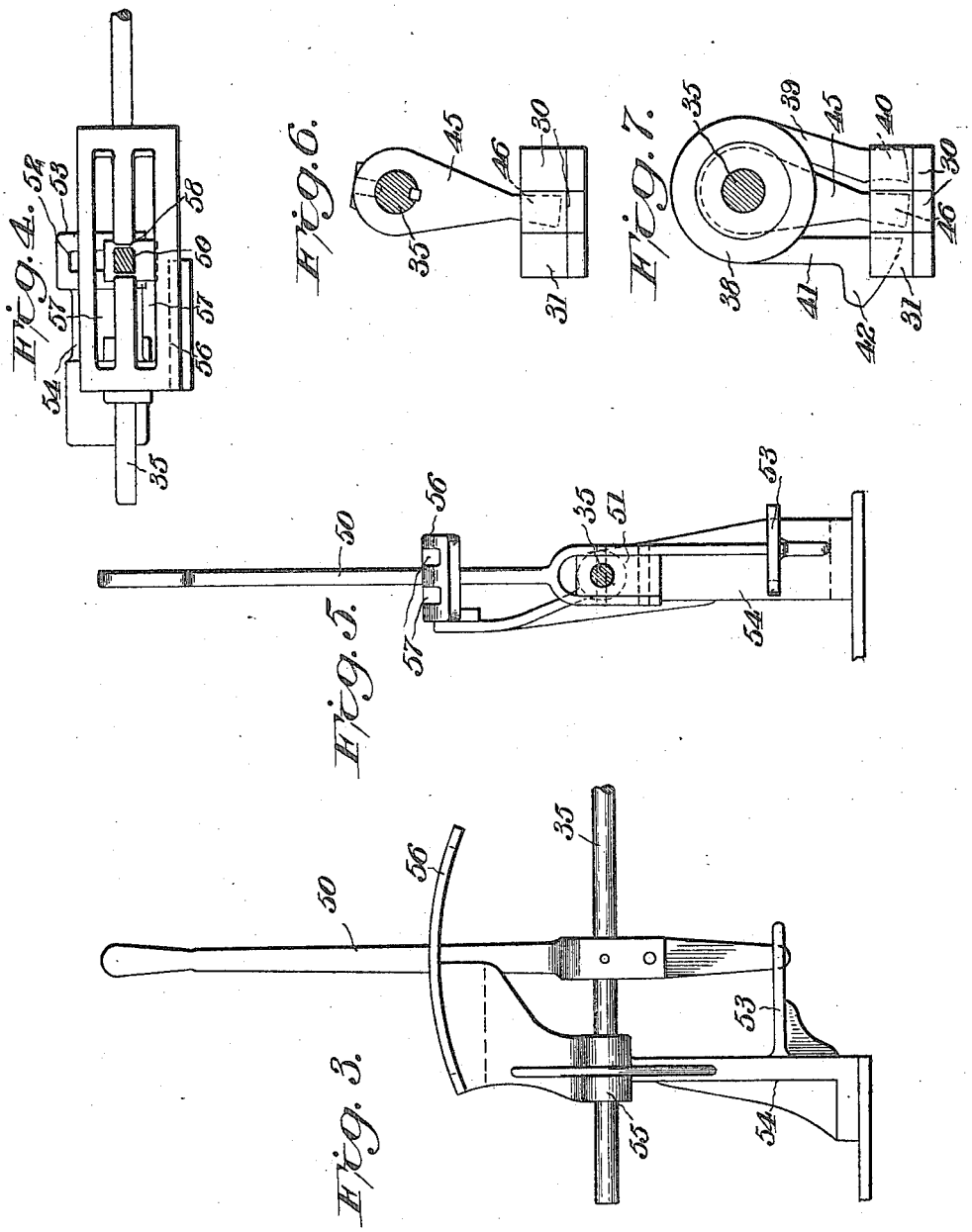

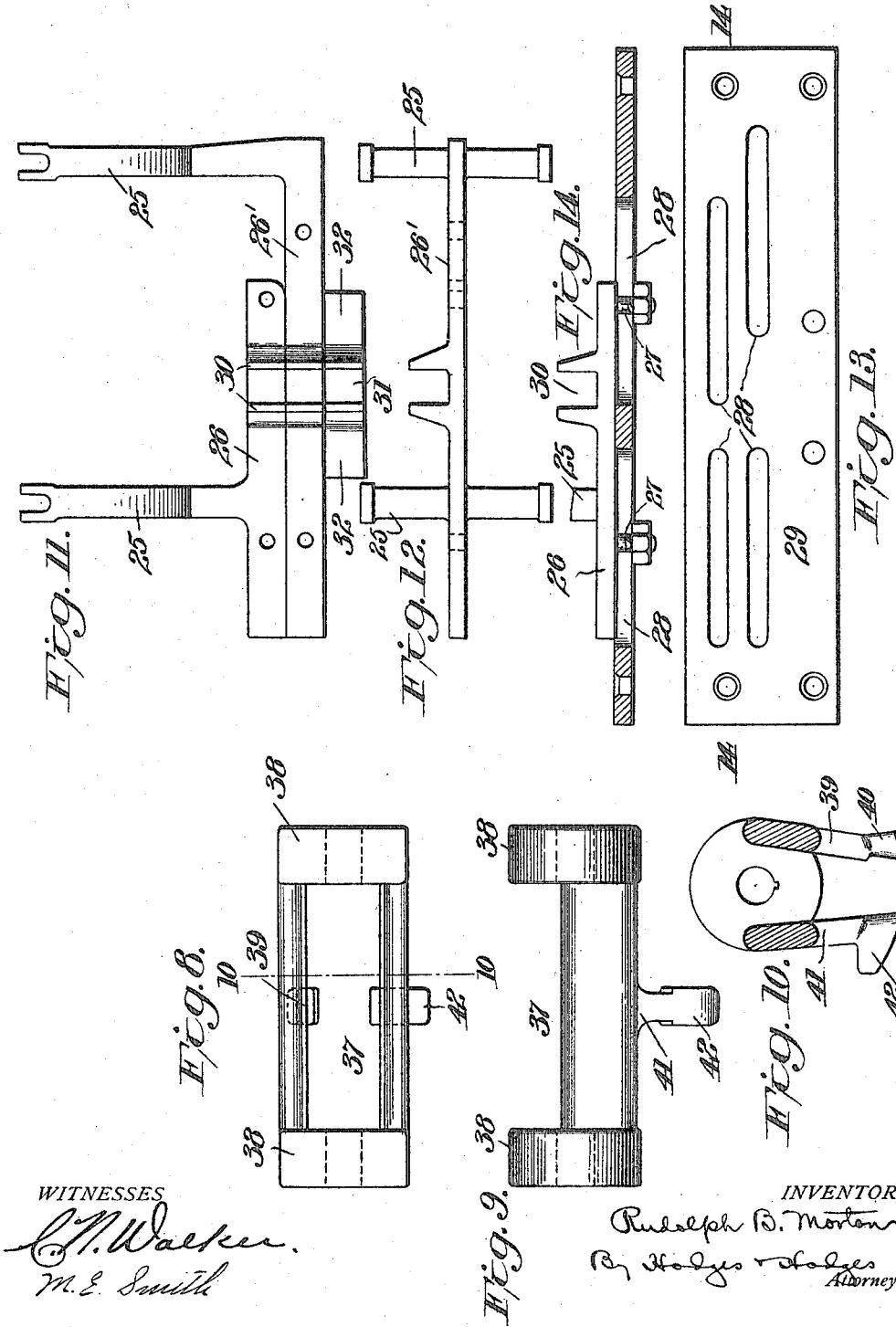

RUDOLPH B. MORTON, OF CLEVELAND, OHIO.

CHANGE-SPEED-GEAR-SHIFTING MECHANISM.

1,188,009. Specification of Letters Patent. Patented June 20, 1916.

Application filed May 1, 1912. Serial No. 694,379.

*To all whom it may concern:*

Be it known that I, RUDOLPH B. MORTON, a citizen of the United States, residing at Cleveland, in the county of Cuyahoga and State of Ohio, have invented new and useful Improvements in Change-Speed-Gear-Shifting Mechanism, of which the following is a specification.

This invention relates to certain new and useful improvements in change speed gear, the same being particularly designed for use on traction engines, automobiles, or the like, although I do not desire to limit myself in this particular.

One of the objects of the invention is to provide shiftable gears in a change speed mechanism which may selectively operated to secure various desirable changes in speed of the moving parts to which power is to be applied, such for instance as the driving shaft of a traction engine, automobile, etc.

A further object is to provide means for controlling and securing a variety of speed changes from and by a single lever.

A further object is to provide improved means by which the selection of the desired shiftable gear is accurately established, and operation or shifting of the remaining shiftable gears positively prevented.

A further object is to provide improved means whereby it is necessary to return all the shiftable gears to inoperative position before a different gear may be selected and shifted to operative position.

A further object is to provide operating means for manipulating the shiftable gears, so constructed that the position thereof indicates whether or not the shiftable gears are in operative or inoperative positions.

A further object is to provide improved means for supporting the selective and locking devices in operative relation with said shiftable gears.

The invention will be hereinafter fully set forth and particularly pointed out in the claims.

In the accompanying drawings:—Figure 1 is a horizontal sectional view illustrating a gear case containing stationary and shiftable gears of a change speed mechanism. Fig. 2 is an end elevation, illustrating the side bars of a traction engine or the like, in cross section. Fig. 3 is a detail side elevation of the operating lever and its adjuncts. Fig. 4 is a plan view thereof. Fig. 5 is an elevation of the lever at right angles to Fig. 3. Fig. 6 is a transverse sectional view on the line 6—6, Fig. 1. Fig. 7 is a similar view on the line 7—7, Fig. 1. Fig. 8 is a detail plan view of the locking device. Fig. 9 is a side elevation thereof. Fig. 10 is a detail cross sectional view of the locking device. Fig. 11 is a top plan view illustrating the gear shifting bars. Fig. 12 is a side view of one of said gear shifting bars. Fig. 13 is a top plan view illustrating the guide for the gear shifting bars, the latter being removed. Fig. 14 is a longitudinal sectional view illustrating the operative relation of said guide and said gear shifting bars.

Referring to the drawing, 10 designates a gear case of suitable or preferred construction, having mounted therein the engine shaft 11, a transmission shaft 12, and a reverse shaft 13. The engine shaft may be driven in any preferred manner by a suitable engine or motor (not shown). Mounted on the engine shaft 11 are slidable gears 14, 15 and 16, the gear 14 being preferably keyed or otherwise secured to the hub 17 of the gear 15, although I do not desire to limit myself in this particular. Said gears 15 and 16 are feathered or otherwise secured to shaft 11 in such manner as to rotate with said shaft, and be free to slide along the latter. Keyed or otherwise secured to the transmission shaft 12 are gears 18, 19 and 20 arranged in such position that they may mesh respectively with the gears 14, 15 and 16, whereby the power transmitted by shaft 11 may be transmitted to the transmission shaft 12 at a number of different speeds. The gear 16 is also adapted to mesh with a reversing gear 21 rotatably mounted upon the reversing shaft and meshing with a gear 22 on the transmission shaft whereby said transmission shaft may be reversed when desired. Power is transmitted from the transmission shaft in any suitable manner, a bevel pinion 23 being illustrated for that purpose, although it is obvious that a different form of pinion may be employed.

The hubs of gears 15 and 16 are connected by yokes 25 with shifting bars 26, 26' slidably mounted in gear case 10 and each provided with downwardly projecting lugs or pins 27 which engage slots 28 in a guide plate 29 supported in said case in any suitable manner. The lugs or pins 27 are provided with suitable heads or caps underlying the slots, and adapted to retain said shifting bars in position on said plate. The shifting bars 26, 26' are provided with upstanding lugs 30, the lugs of the two bars being arranged in alinement, and also in alinement with the lugs 31 of a locking bar 32 secured to the plate 29 adjacent the shifting arms 26, 26'. A longitudinally slidable rock shaft 35 is mounted in suitable bearings 36 in case 10 and supported thereby is a saddle 37 provided with hubs 38 which are feathered or otherwise secured to said shaft to permit relative longitudinal movement of the latter, but insuring that said saddle shall oscillate with said shaft. Depending from one side of the saddle 37 is a locking arm 39 provided with a narrow locking head 40, and depending from the other side of said saddle is a second locking arm 41 provided with an elongated transversely arranged locking head 42. When the gears 14, 15 and 16 are all in their normal inoperative positions the locking head 40 is engaged with the lugs 30 of the shifting bar 26, and the inner portion of the locking head 42 is in engagement with the lugs 30 of the shifting bar 26', the projecting portion of said locking head 42 extending laterally beyond said lugs. Keyed or otherwise rigidly secured to said shaft 35 is a selector finger 45 provided with a head 46 adapted to engage the lugs 30 of either shifting bar 26, 26'.

The rock shaft 35 is operated by means of a lever 50 pivotally connected to a block 51, rigidly secured to said shaft, the lower end of said lever being mounted in a slot 52 formed in a web or plate 53 extending from a bracket or support 54, said slot being arranged transversely of said shaft. Said bracket is also provided with a bearing 55 for said shaft, and a guide plate or quadrant 56 formed with two parallel slots 57 communicating by means of a cross slot 58, the upper end of said lever being extended through said guide plate and arranged to work within the slots of the latter. The number of slots 57 will correspond with the number of shifting bars 26, 26'.

In practice, the normal position of the lever 50 is within the cross slot 58, and when the lever is in this position the locking head 42 is in engagement with the locking bar 32 and the lugs 30 of the shifting bar 26', and the locking arm 39 in engagement with the lugs 30 of the shifting bar 26. When it is desired to shift any of the gears 14, 15, 16, the lever 50 is swung laterally into either of the slots 57, according to the gear to be selected, and the effect of this movement is to oscillate the rock shaft 35, the saddle 37 and the selector finger 45. Assuming therefore, that the lever was moved to the upper slot 57, Fig. 4 the locking arms and selector finger would assume the positions indicated in dotted lines, Fig. 6. From this it will be seen that the locking head 40 will have been moved out of engagement with the lugs of the shifting bar 26, and the selector finger 45 will have been moved into engagement with said lugs. At the same time the locking head 42 will have been moved so as to simultaneously engage the lugs 30 of bar 26' and the lugs 31 of the locking bar 32, thereby locking said bar 26' against longitudinal movement. It is obvious that if the foregoing movement of the lever 50 should be reversed the bar 26 would be locked by reason of the locking head 40 engaging with the lugs 30 of said bar, the head 42 having moved out of engagement with the lugs 30 of the bar 26', leaving the latter free to be shifted longitudinally, said head 42, however, remaining in engagement with the locking lugs 31. In either event it will be noted that just as soon as the lever 50 is moved into either of the slots 57 it may be shifted longitudinally in either direction, as desired, the slot 52 permitting rocking of the lever, above described, and then acting as a fulcrum when the lever is rocked to move the shaft longitudinally. As the lever is rocked thus the shaft 35 is correspondingly moved, and through the selector finger 45 will impart a longitudinal movement to the respective shifting bar 26, 26' with which it may have been engaged, effecting a corresponding shifting of one of the gears 15 and 16. As the shaft 35 is shifted longitudinally the saddle 37 is held against corresponding movement by reason of the engagement of the locking head 42, with the locking lugs 31 of the locking bar 32, the space between the hubs 39 permitting the longitudinal movement of the selector finger 45 necessary to operate the selected shifting bar. From the foregoing it will be observed that the cross slot 58 and the locking lugs 31 coöperate to indicate and secure the parts in neutral positions, and that by reason of this relation the operator can determine by the position of his lever 50 which of the shifting bars 26, 26' has been engaged by the selector finger, and then the direction in which the lever is shifted longitudinally will indicate the particular change in the speed or direction that is to be secured. It will be further noted that while I have shown but two gear shifting bars and four gear changes, I do not desire to limit myself in this connection, as it is obvious that any number of shifting bars may be employed, all of which may be selectively operated from the single lever 50 by means of the selector finger 45 and its adjuncts.

Having thus explained the nature of my invention and described an operative manner of constructing and using the same, although without attempting to set forth all of the forms in which it may be made, or all of the forms of its use, what I claim is:—

1. An improvement in change speed mechanism comprising gear shifting bars, a stationary locking bar parallel therewith, said shifting and locking bars having lugs arranged in alinement, bar operating means for selectively engaging the lugs of the shifting bars, and oscillatory locking means normally engaging with the lugs of the locking bar and having means for selectively engaging the lugs of either gear shifting bar when the other is engaged by the said operating means.

2. An improvement in change speed mechanism comprising longitudinally movable gear shifting bars, a stationary locking bar parallel therewith, said shifting and locking bar having lugs arranged in alinement, bar operating means movable transversely of said bars for selectively engaging the lugs of said shifting bars, and oscillatory locking means normally engaging with the lugs of the locking bar and having means for selectively engaging the lugs of either gear shifting bar when the other is engaged by said operating means.

3. An improvement in change speed mechanism comprising gear shifting bars, a stationary locking bar parallel therewith, said shifting and locking bars having lugs arranged in alinement, a selector finger for selectively engaging the lugs of said shifting bars, and oscillatory locking means normally in engagement with the lugs of the locking bar and having means for selectively engaging the lugs of either gear shifting bar when the other is engaged by said selector finger.

4. An improvement in change speed mechanism comprising gear shifting bars, a stationary locking bar, a selector finger, means for actuating said selector finger to selectively engage said shifting bars, and oscillatory means being arranged to engage and disengage said locking and shifting bars to prevent movement of either shifting bar when the other is engaged by said selector finger.

5. An improvement in change speed mechanism comprising gear shifting bars, a stationary locking bar, a selector finger, means for actuating said selector finger to selectively engage said shifting bars, and oscillatory locking fingers, oscillatory means being arranged to engage and disengage said locking and shifting bars to prevent movement of either shifting bar when the other shifting bar is engaged by said selector finger, said locking fingers being operated simultaneously with the selective operation of said selector finger.

6. An improvement in change speed mechanism comprising gear shifting bars, a stationary locking bar, a selector finger, means for actuating said finger to selectively engage said shifting bars, and also to operate the selected shifting bar, and spaced apart oscillatory locking fingers operated simultaneously with the selective operation of said selector finger, said locking fingers being arranged to engage and disengage said locking and shifting bars to prevent movement of either shifting bar when the other shifting bar is engaged by said selector finger, said selector finger being located in a plane between said locking fingers.

7. An improvement in change speed mechanism comprising gear shifting bars, a stationary locking bar, means for selectively actuating said shifting bars, and oscillatory locking fingers one of which is arranged to engage said locking bar and to engage and disengage one of said shifting bars, the other finger being arranged to engage the other shifting bar to prevent movement of either shifting bar when the other shifting bar is engaged by the selector finger, said selector finger being located in a plane between said locking finger.

8. An improvement in change speed mechanism comprising gear shifting bars, a stationary locking bar, means for selectively actuating said shifting bars, and oscillatory locking fingers being arranged to engage and disengage said locking and shifting bars to prevent movement of either shifting bar when the other is engaged with said selective operating means, and means for operating said shifting bar actuating means and said locking fingers in unison.

9. An improvement in change speed mechanism comprising gear shifting bars, a stationary locking bar, means for selectively actuating said shifting bars, and oscillatory locking fingers connected with said selective operating means and actuated simultaneously with the latter, said locking fingers being arranged to engage and disengage said locking and shifting bars to prevent movement of either shifting bar when the other is engaged with said selective operating means.

10. An improvement in change speed mechanism comprising gear shifting bars, a stationary locking bar, means for selectively actuating said shifting bars, and spaced apart locking fingers arranged to engage said oscillatory locking bar to normally prevent movement of said shifting bars, said locking fingers being constructed to prevent movement of either of said shifting bars when the other is engaged by said selective operating means, one of said locking fingers being provided with a laterally extended locking head.

11. An improvement in change speed mechanism comprising a rock shaft, a saddle mounted to swing therewith, gear shifting bars, a stationary locking bar, means for selectively actuating said shifting bars, and locking arms carried by said saddle and coöperating with said locking bar to normally prevent movement of said shifting bars, said locking fingers being constructed to prevent movement of either of said shifting bars when the other is engaged by said selective actuating means.

12. An improvement in change speed mechanism comprising a rock shaft, a saddle mounted to swing therewith, gear shifting bars, a stationary locking bar, means for selectively actuating said shifting bars, and locking arms carried by said saddle and coöperating with said locking bar to normally prevent movement of said shifting bars, said locking fingers being constructed to prevent movement of either of said shifting bars when the other is engaged by said selective actuating means, one of said locking arms being provided with a laterally extended locking head.

13. An improvement in change speed mechanism comprising a rock shaft, a saddle mounted to swing therewith and having spaced apart sides provided with locking arms, gear shifting bars, a stationary locking bar, means located between the sides of said saddle for selectively actuating said shifting bars, and locking arms depending from the sides of said saddle and coöperating with said locking bar to normally prevent movement of said shifting bars, said locking fingers being constructed to prevent movement of either shifting bar when the other is engaged by said selective actuating means.

14. An improvement in change speed mechanism comprising a rock shaft, a saddle mounted to swing therewith but free to permit relative longitudinal movement, gear shifting bars, a stationary locking bar, a selector finger rigidly secured to said shaft and arranged to selectively engage either of said shifting bars, means carried by said saddle for coöperating with said locking bar to normally prevent movement of said shifting bars, said locking means also including means for preventing movement of either shifting bar when the other is engaged by said selector finger, and means for oscillating said shaft and also for moving the same longitudinally.

15. An improvement in change speed mechanism comprising a rock shaft, a saddle mounted to swing therewith but free to permit relative longitudinal movement, gear shifting bars, a stationary locking bar, a selector finger rigidly secured to said shaft and arranged to selectively engage either of said shifting bars, locking fingers carried by said saddle and coöperating with said locking bar to normally prevent movement of said shifting bars, said locking fingers being constructed to prevent movement of either shifting bar when the other is engaged by said selector finger, and means for oscillating said shaft and also for moving the same longitudinally.

16. An improvement in change speed mechanism comprising a rock shaft, a saddle mounted to swing therewith but free to permit relative longitudinal movement, gear shifting bars, a stationary locking bar, a selector finger rigidly secured to said shaft and arranged to selectively engage either of said shifting bars, said selector finger being located between the sides of said saddle, means carried by said saddle for coöperating with said locking bar to normally prevent movement of said shifting bars, said locking means also including means for preventing movement of either shifting bar when the other is engaged by said selector finger, and means for oscillating said shaft and also for moving the same longitudinally.

17. An improvement in change speed mechanism comprising a rock shaft, a saddle mounted to swing therewith but free to permit relative longitudinal movement, gear shifting bars, a stationary locking bar, a selector finger rigidly secured to said shaft and arranged to selectively engage either of said shifting bars, said selector finger depending from said shaft at a point between the sides of said saddle, depending locking fingers carried by said saddle and coöperating with said locking bar to normally prevent movement of said shifting bars, said locking fingers being constructed to prevent movement of either shifting bar when the other is engaged by said selector finger, and means for oscillating said shaft and also for moving the same longitudinally.

18. An improvement in change speed mechanism comprising a rock shaft, a saddle mounted to swing therewith but free to permit relative longitudinal movement, gear shifting bars, a stationary locking bar, a selector finger rigidly secured to said shaft and arranged to selectively engage either of said shifting bars, said selector finger depending from said shaft at a point between the sides of said saddle, depending locking fingers carried by said saddle and coöperating with said locking bar to normally prevent movement of said shifting bars, said locking fingers being constructed to prevent movement of either shifting bar when the other is engaged by said selector finger, and means for oscillating said shaft and also for moving the same longitudinally, one of said locking fingers being provided with a laterally extended locking head.

19. An improvement in change speed mechanism comprising gear shifting bars provided with lugs, a plate provided with guide slots to receive said lugs, a locking bar, operating means for selectively engaging either of said shifting bars, and oscillatory means coöperating with said locking bar to normally prevent movement of said shifting bars, said locking means also including means for preventing movement of either of said shifting bars, when the other is engaged by said operating means.

20. An improvement in change speed mechanism comprising gear shifting bars provided with headed lugs, a guide plate upon which said shifting bars are arranged to slide, said guide plate being provided with slots to receive said lugs, the heads of said lugs underlying said slots to retain said shifting bars in position on said plate, a locking bar, operating means for selectively engaging either of said shifting bars, and oscillatory means coöperating with said locking bar to normally prevent movement of said shifting bars, said locking means also including means for preventing movement of either shifting bar when the other is engaged by said operating means.

21. An improvement in change speed mechanism comprising gear shifting bars, means for selectively shifting said bars, means for selectively locking said bars, a lever for operating said shifting and said locking means, a bracket in which said lever is mounted, said bracket being provided with guide slots to permit movement of the lever to shift said bars, said guide slots corresponding in number to said bars, said slots being connected by a cross slot relatively positioned with respect to the locking means to cause all of the shifting bars to be locked when said lever is in said cross slot.

22. An improvement in change speed mechanism comprising gear shifting bars, means for selectively shifting said bars, means for selectively locking said bars, a lever for operating said shifting and said locking means, a bracket in which said lever is mounted, said bracket being provided with guide slots to permit movement of the lever to shift said bars, the sides of said slots forming fulcrums for lateral movements of said lever, and means engaging the lower end of said lever to permit swinging movement of said end when the lever is fulcrumed against the sides of the guide slots, and for preventing movement of said end when the lever is moved longitudinally of the guide slots, said guide slots corresponding in number to said gear shifting bars and being connected by a cross slot relatively positioned with respect to the locking means to cause all of the shifting bars to be locked when said lever is in said cross slot.

23. An improvement in change speed mechanism comprising gear shifting bars, a locking bar, a longitudinally movable rock shaft, means connected with said rock shaft for selectively actuating said shifting bars, a locking member operated by oscillation of said shaft and coöperating with said locking bar for locking either of the shifting bars when the other is engaged by the shifting means, a bracket in which one end of said shaft is mounted, a lever attached to said shaft and fulcrumed in said bracket, said bracket being provided with a quadrant having spaced apart slots parallel with said shaft and corresponding in number with said shifting bars, said slots being connected by a single transverse slot, said locking bar and locking member being relatively positioned with respect to the cross slot to cause all of the shifting bars to be locked when said lever is in said cross slot.

In testimony whereof I have hereunto set my hand in presence of two subscribing witnesses.

RUDOLPH B. MORTON.

Witnesses:
WM. S. HODGES,
CHAS. E. RIORDAN.

Copies of this patent may be obtained for five cents each, by addressing the "Commissioner of Patents, Washington, D. C."